US009600701B1

(12) United States Patent
Chien et al.

(10) Patent No.: US 9,600,701 B1
(45) Date of Patent: Mar. 21, 2017

(54) INTER-DEVICE DATA TRANSFER BASED ON BARCODES

(71) Applicant: Dropbox, Inc., San Francisco, CA (US)

(72) Inventors: Jonathan Chien, San Francisco, CA (US); Richard Ian Orton, San Francisco, CA (US); Gellert Weisz, San Francisco, CA (US); Vikrant Varma, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/985,016

(22) Filed: Dec. 30, 2015

(51) Int. Cl.
*G06K 7/14* (2006.01)

(52) U.S. Cl.
CPC .................. *G06K 7/1417* (2013.01)

(58) Field of Classification Search
CPC .................................................. G06K 7/1417
See application file for complete search history.

(56) References Cited

U.S. PATENT DOCUMENTS

| 8,427,979 | B1 | 4/2013 | Wang | |
|---|---|---|---|---|
| 2005/0269411 | A1* | 12/2005 | Vesikivi | G06K 7/10851 235/462.01 |
| 2012/0330845 | A1* | 12/2012 | Kang | G06Q 40/02 705/71 |
| 2013/0092738 | A1* | 4/2013 | Blasinski | G06K 19/0614 235/462.04 |
| 2013/0325728 | A1 | 12/2013 | Bialostok et al. | |
| 2014/0084067 | A1* | 3/2014 | Vanderhulst | H04B 10/116 235/462.01 |

(Continued)

OTHER PUBLICATIONS

VisiHow, "Transfer Files Your PC to an Android Device Using Qr Codes", http://visihow.com/Transfer_Files_from_Your_PC_to_an_Android_Device_Using_Qr_Codes, dated Dec. 1, 2015, 7 pages. TagMyDoc, "Android Apps on Google Play", https://play.google.com/store/apps/details?id=com.tagmydoc.android$hl=en, dated Dec. 1, 2015, 3 pages.

(Continued)

*Primary Examiner* — Kristy A Haupt
(74) *Attorney, Agent, or Firm* — Hickman Palermo Becker Bingham LLP (57) ABSTRACT

A sending computing device encodes data items as barcodes and simultaneously displays two or more barcodes on a first display screen of, or operatively coupled to, the sending computing device. A receiving computing device obtains the two or more barcodes from a single video frame captured by a first camera module of, or operatively coupled to, the receiving computing device. Furthermore, the receiving computing device encodes, as an acknowledgement barcode, an acknowledgement that identifies each barcode that was successfully received and displays the acknowledgement barcode on a second display screen of, or operatively coupled to, the receiving computing device. The sending computing device captures the acknowledgement barcode via a second camera module of, or operatively coupled to, the sending computing device. Based on the acknowledgement barcode, the sending computing device determines which of the data items were or were not successfully received by the receiving computing device.

20 Claims, 8 Drawing Sheets

(56) References Cited

U.S. PATENT DOCUMENTS

2015/0261970 A1* 9/2015 Mevec ............... G06F 11/1448
726/29
2015/0304369 A1 10/2015 Sandholm et al.

OTHER PUBLICATIONS

SuperBeam, "WiFi Direct Share-Android Apps on Google Play", https://play.google.com/store/apps/details?id=com/majedev. superbeam&referrer, dated Dec. 1, 2015, 4 pages.

* cited by examiner

INTER-DEVICE DATA TRANSFER BASED ON BARCODES

TECHNICAL FIELD

The present Application relates to data transfer technology. More specifically, the example embodiment(s) of the present Application relate to inter-device data transfer based on barcodes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Inter-device communication typically relies on data transmission via electrical impulses or radio waves. However, such forms of data transmission can be impracticable in some situations. For example, mobile device users generally avoid carrying cables and other accessories with their mobile devices. As another example, radio frequency transmissions can be prohibited in certain environments, such as during airline flights. Thus, there is a need for a communication medium that is independent of logistical and environmental considerations.

BRIEF DESCRIPTION OF THE DRAWINGS

The example embodiment(s) of the present invention are illustrated, by way of example and not limitation, in the accompanying drawings in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) the present Application. It will be apparent, however, that the example embodiment(s) may be practiced without these specific details. In other instances, well-known structures and devices are shown in block diagram form in order to avoid unnecessarily obscuring the example embodiment(s). Modifiers such as "first" and "second" may be used to differentiate elements, but the modifiers do not necessarily indicate any particular order.

General Overview

In some example embodiments, a sending computing device can send information to a receiving computing device based on optical machine-readable representations of the information. For example, the information can be a document that the sending computing device encodes as a sequence of Quick Response (QR) codes. The sequence of QR codes can be displayed, to the receiving computing device, in a video fashion based on video frames that each include multiple QR codes.

When the receiving computing device's camera captures a video frame, an acknowledgement is sent to the sending computing device. The acknowledgement is encoded as an acknowledgement QR code that identifies one or more QR codes that were received from the sending computing device. Multiple acknowledgements can be displayed, to the sending computing device's camera, in a video fashion.

Based on the acknowledgements, the sending computing device can determine which QR codes were successfully received and which QR codes were not successfully received by the receiving computing device. In response, the sending computing device can resend any undelivered QR codes and/or modify how at least some of the sequence of QR codes are to be encoded and/or displayed.

General Architecture

Figure 1:
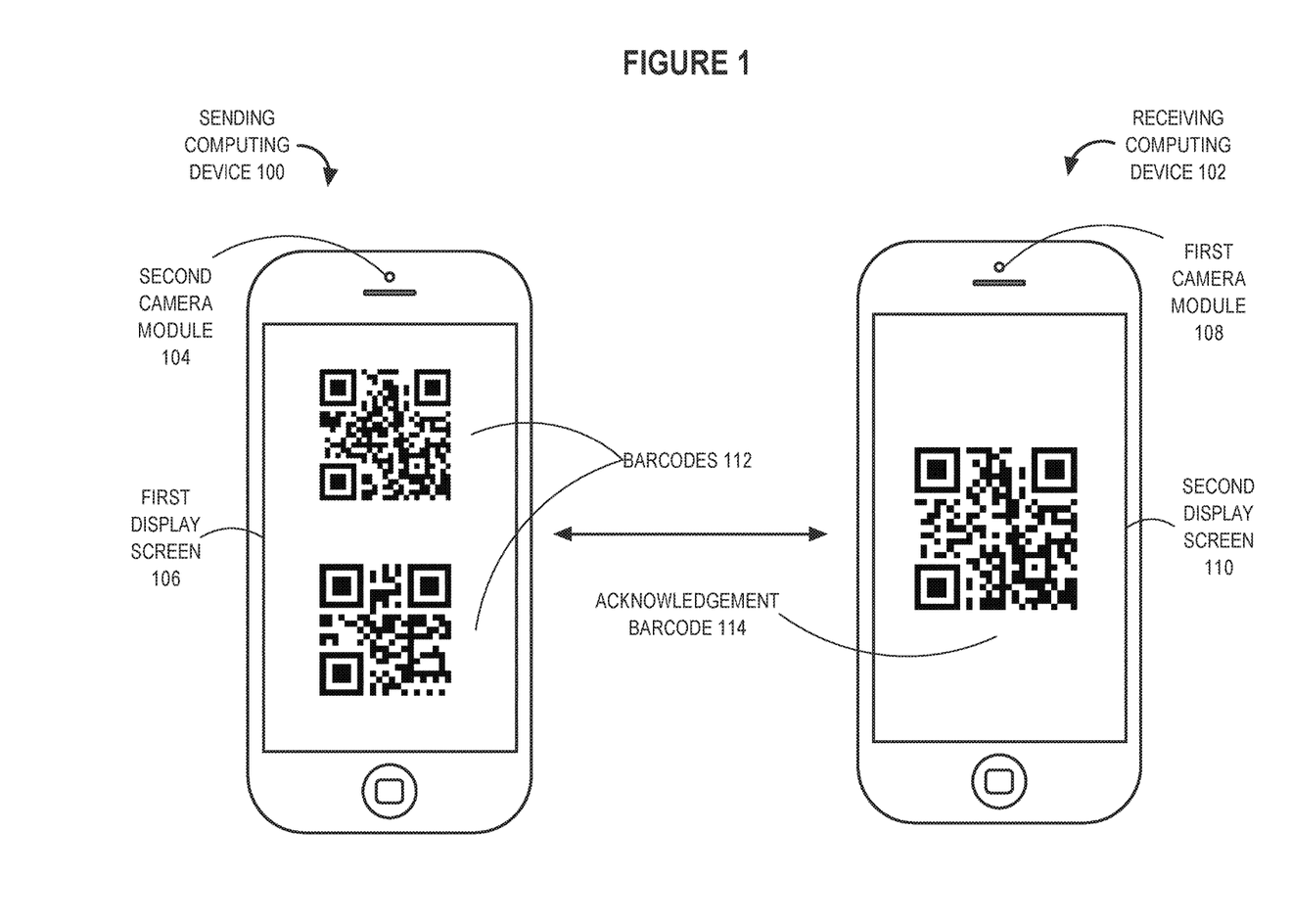
FIG. 1 depicts an example computer architecture upon which embodiments may be implemented.

FIG. 1 depicts an example computer architecture upon which embodiments may be implemented. Referring to FIG. 1, sending computing device 100 and receiving computing device 102 are involved in bidirectional communication with each other. Sending computing device 100 is associated with second camera module 104 and first display screen 106. Receiving computing device 102 is associated with first camera module 108 and second display screen 110. First display screen 106 displays barcodes 112, and second display screen 110 displays acknowledgement barcode 114.

A "computing device" can be one or more physical computers and/or virtual computers. For example, a computing device can be one or more desktop computers, laptop computers, mobile devices, and/or virtual machine instances or virtual machine computing elements such as virtual processors, storage, and memory.

A computing device can include or be operatively coupled to a display screen (e.g., first display screen 106, second display screen 110) and/or a camera module (e.g., first camera module 108, second camera module 104). For example, smartphones and tablet computers typically have built-in display screens and camera modules. In contrast, desktop computers are typically connected to display screens and camera modules that are peripheral devices.

A display screen can be an output component of a computing device, a monitor, and/or a television. Examples of display screens include liquid-crystal displays (LCDs), light-emitting diode (LED) displays, plasma displays, and cathode ray tube (CRT) displays.

A camera module can be an input component of a computing device. Additionally or alternatively, a camera module can be a separate input device that is operatively coupled to a computing device. Examples of camera modules include front-facing cameras of smartphones and webcams that are connected via a Universal Serial Bus (USB) to a desktop computer.

In the example of FIG. 1, sending computing device 100 and receiving computing device 102 are oriented such that first display screen 106 associated with sending computing device 100 can be captured by first camera module 108 associated with receiving computing device 102. Similarly, second display screen 110 associated with receiving computing device 102 is oriented such that it can be captured by second camera module 104 associated with sending computing device 100. Thus, images (e.g., barcodes 112) that are displayed on first display screen 106 can be captured by first camera module 108, and one or more images (e.g., acknowledgement barcode 114) that are displayed on second display screen 110 can be captured by second camera module 104.

For example, a user of sending computing device 100 may hold device 100 in a vertical orientation with first display screen 106 facing second display screen 110 of receiving computing 102, which is held by another user also in the substantially same vertical orientation. The devices 100 and 102 may be held such that the first and second camera modules 104 and 108 are in the substantially same horizontal plane. The horizontal distance between the devices 100 and 102 may be within a few feet, for example. Here, horizontal is defined as a plane that is parallel to a user's eyes regardless of the user's orientation, and vertical is defined as a plane that is perpendicular to the horizontal as just defined.

Barcodes 112 can be any of a number of optical machine-readable representations of data. Barcodes 112 can be one-dimensional or multi-dimensional. Examples of one-dimensional barcodes include Universal Product Codes (UPCs) and Postal Numeric Encoding Technique (POSTNET) symbols. Examples of multi-dimensional barcodes include matrix barcodes, such as CrontoSigns, ShotCodes, and QR codes.

Acknowledgement barcode 114 can be an optical machine-readable representation of data that indicates successful receipt of one or more barcodes. Acknowledgement barcode 114 can be one-dimensional or multi-dimensional. As will be described in greater detail below, acknowledgement barcode 114 can serve as an "ACK" in a communications protocol.

Encoding Data

Figure 2:
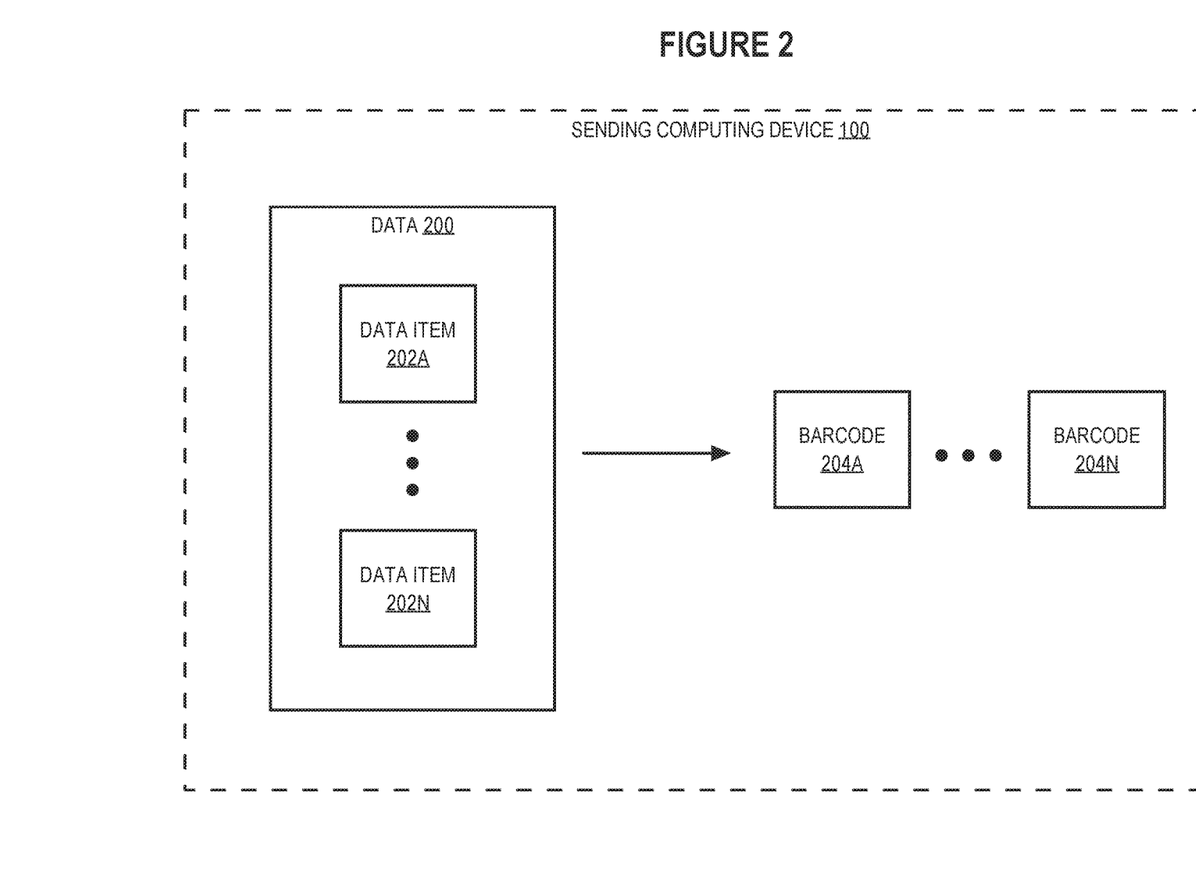
FIG. 2 depicts example encoded data.

Prior to displaying barcode data, a computing device obtains the barcode data. In some example embodiments, obtaining barcode data includes encoding non-barcode data into the barcode data. Encoding can be performed by instructions at the computing device. FIG. 2 depicts example encoded data. Referring to FIG. 2, data 200 is encoded into barcodes 204A-N at sending computing device 100. Data 200 includes data items 202A-N.

In some example embodiments, data 200 can be a document that a user of sending computing device 100 wishes to share with receiving computing device 102. Data 200 can be divided into blocks and/or chunks, such as data items 202A-N. Each data item of data items 202A-N can correspond to a barcode of barcodes 204A-N. For example, each data item can correspond to a different page of the document, and each barcode can be a QR code representation of a page. To preserve the sequence of data items 202A-N, each barcode can be indexed according to a sequence number.

In some example embodiments, data items 202A-N and barcodes 204A-N can be relatively uniform in size. For example, a maximum number of bytes (e.g., three kilobytes) can be predetermined for each barcode. This maximum number is hereinafter referenced as the "data density" of a barcode. As will be described in greater detail below, data density can be empirically tuned based on data loss. In general, lower data density improves barcode detection rates, throughput, and reliability.

Displaying Barcodes

Figure 3:
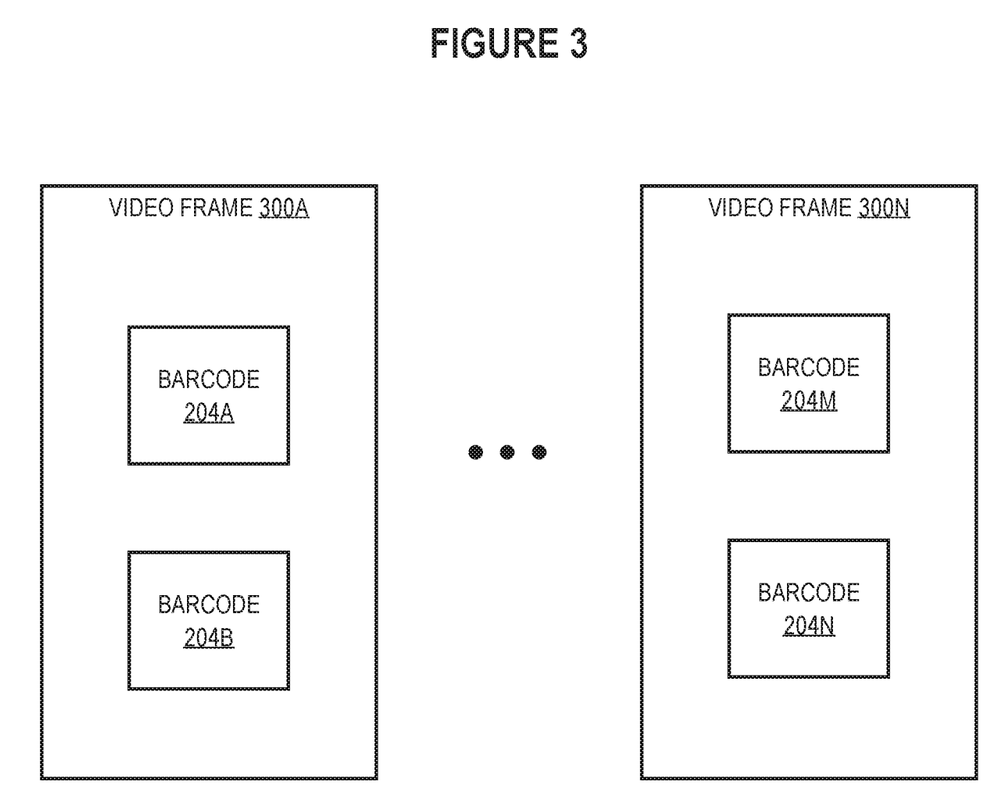
FIG. 3 depicts example video frames.

Encoded data is transmitted based on displaying the encoded data in video frames. FIG. 3 depicts example video frames. Referring to FIG. 3, video frames 300A-N include barcodes 204A-N. For example, video frame 300A includes barcodes 204A-B, and video frame 300N includes barcodes 204M-N.

Video frames 300A-N can be used to display barcodes 204A-N in a video fashion. A sequence of video frames (e.g., video frames 300A-G) can be displayed in succession, much like the pages of a flipbook. Each video frame can be displayed for a predetermined length of time. This predetermined length of time can be represented as a "frame rate," such as sixty frames per second. As will be described in greater detail below, frame rate can be empirically tuned based on data loss.

In some example embodiments, video frames 300A-N can match the shape of a display screen. Thus, rectangular display screens can display rectangular video frames. To make optimal use of a rectangular video frame, each rectangular video frame can include multiple barcodes. For example, QR codes are typically square, so two QR codes can be included in a rectangular video frame. Thus, sending computing device 100 can simultaneously display multiple barcodes in a single video frame.

Acknowledgement Barcodes

Figure 4:
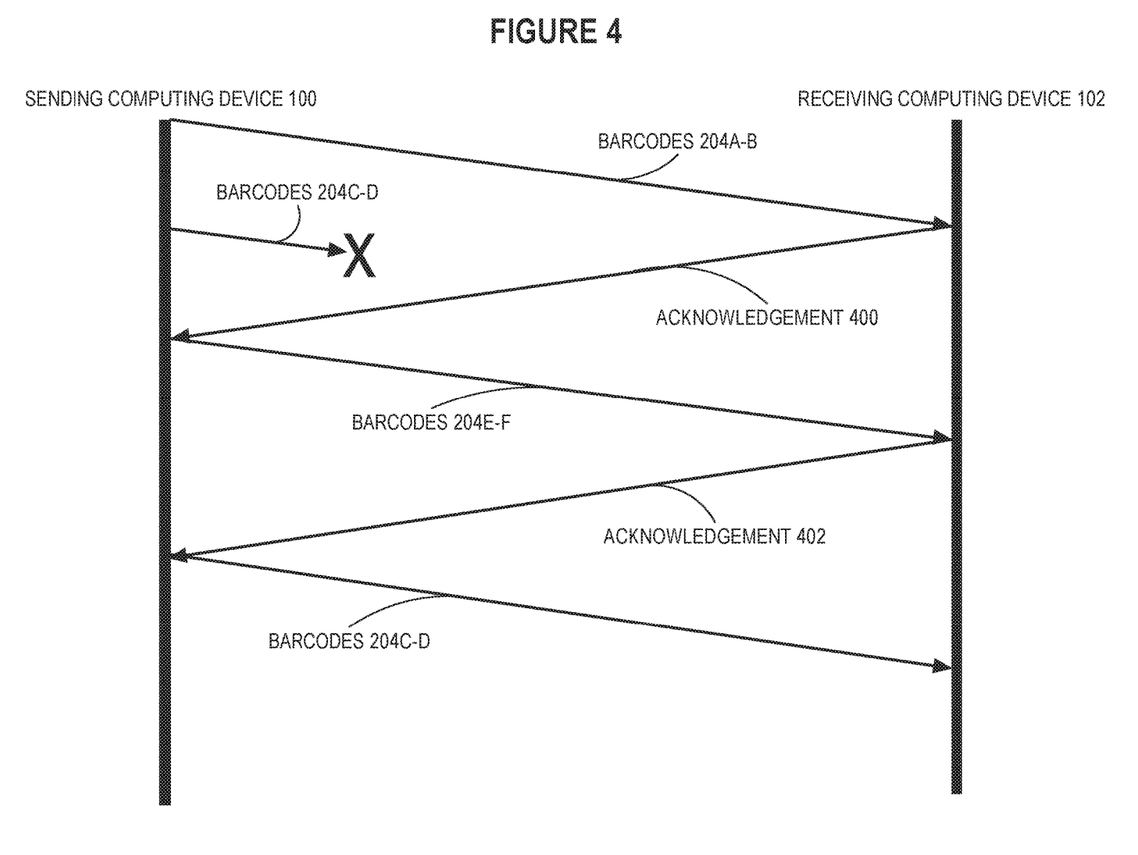
FIG. 4 depicts an example communication protocol.

To ensure proper delivery of encoded data, any of a number of communication protocols can be implemented. FIG. 4 depicts an example communication protocol. Referring to FIG. 4, sending computing device 100 displays barcodes 204A-F, in pairs, to receiving computing device 102, which displays acknowledgements 400 and 402 to sending computing device 100. In response, sending computing device 100 causes barcodes 204C-D to be displayed again.

In the example of FIG. 4, sending computing device 100 displays barcodes 204A-B in video frame 300A. Each barcode can include a sequence number for the barcode. For example, barcodes 204A-B can correspond to sequence numbers "1" and "2", respectively. In some example embodiments, error correction is already encoded in the barcode. For example, QR codes have built-in error correction.

Receiving computing device 102 obtains barcodes 204A-B from video frame 300A. The sequence numbers of barcodes 204A-B can be extracted and encoded in acknowledgement 400 as an acknowledgement barcode 114. For example, the sequence numbers can be stored in acknowledgement 400 as the array [1, 2]. The acknowledgement barcode 114 can be displayed to sending computing device 100.

In the example of FIG. 4, barcodes 204C-D correspond to sequence numbers "3" and "4", and barcodes 204E-F correspond to sequence numbers "5" and "6". Barcodes 204C-D are not successfully received by receiving computing device 102, but barcodes 204E-F are successfully received by receiving computing device 102. Thus, acknowledgement 402 includes the array [1, 2, 5, 6], which identifies barcodes 204A-B and 204E-F as successfully received.

Based on acknowledgement 402, sending computing device 100 can determine which barcodes were successfully received and, by virtue of exclusion, which barcodes were not successfully received. In response to determining that barcodes 204C-D were not successfully received, sending computing device 100 repeats displaying barcodes 204C-D to receiving computing device 102.

In some example embodiments, barcodes 204A-N can be divided into "windows" that are each a predetermined size (e.g., thirty barcodes). A window "slides" when each barcode associated with the window has been acknowledged. For example, window A and window B are associated with barcodes A-D and E-H, respectively. Sending computing device 100 can avoid displaying any of barcodes E-H until barcodes A, B, C, and D have each been acknowledged.

In some example embodiments, a particular barcode can indicate an "end of file". Additionally or alternatively, a particular barcode can serve as a header barcode that indicates a final sequence number and/or a total number of barcodes.

As will be described in greater detail below, a data transfer rate can be empirically tuned based on one or more acknowledgement barcodes. For example, if a predetermined threshold of data loss is reached, the data transfer rate can be modified based adjusting data density, frame rate, and/or display settings. Thus, the data transfer rate can be dynamically adapted for various distances between computing devices.

In some example embodiments, the data transfer rate can be empirically tuned based on a "slow start" protocol. For example, the data transfer rate can start low and increase until data loss occurs. Additionally or alternatively, at least an initial data transfer rate can be determined based on estimating the distance between computing devices. For example, a communication protocol can begin with receiving computing device 102 displaying an image (e.g., a barcode) of a known size. Based on the known size of the image, sending computing device 100 can estimate the distance between the computing devices and calibrate the data transfer rate accordingly.

Superimposed Barcodes

Figure 5:
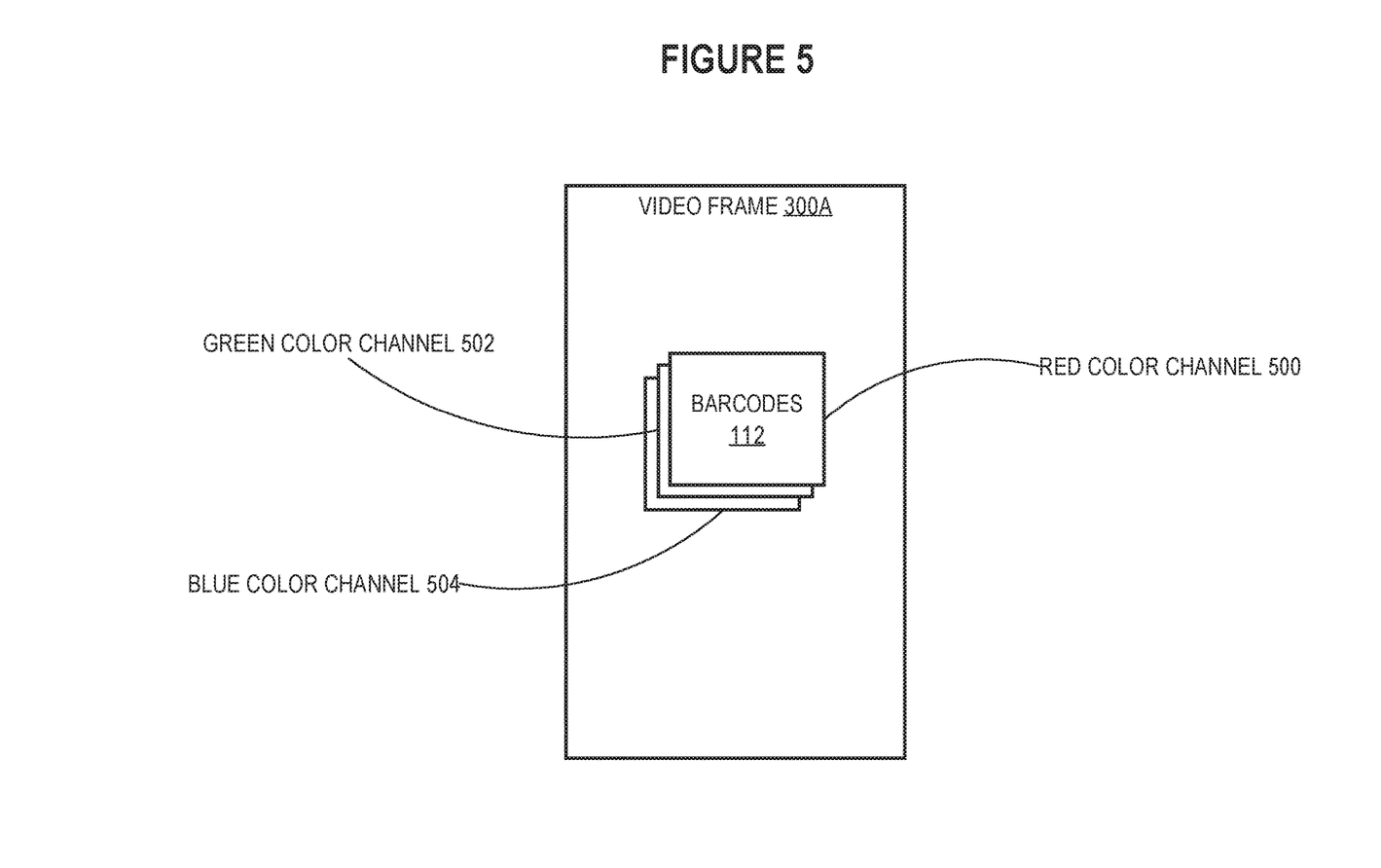
FIG. 5 depicts an example plurality of overlaid barcodes.

Multiple barcodes can be displayed in a single video frame in any of a number of ways. As mentioned above, the multiple barcodes can be displayed adjacent to each other in the single video frame. Alternatively, the multiple barcodes can be overlaid with respect to each other. FIG. 5 depicts an example plurality of overlaid barcodes. Referring to FIG. 5, video frame 300A includes barcodes 112, which has a red color channel 500, a green color channel 502, and a blue color channel 504.

Each barcode of barcodes 112 can correspond to a different color channel. For example, barcodes 112 can include barcodes 204A-C. Thus, three different barcodes can be simultaneously displayed in a single video frame. Barcode 204A can be encoded in red, barcode 204B can be encoded in green, and barcode 204C can be encoded in blue. Since each barcode corresponds to a different color, multiple barcodes can occupy the same space.

Process Overview

Figure 6:
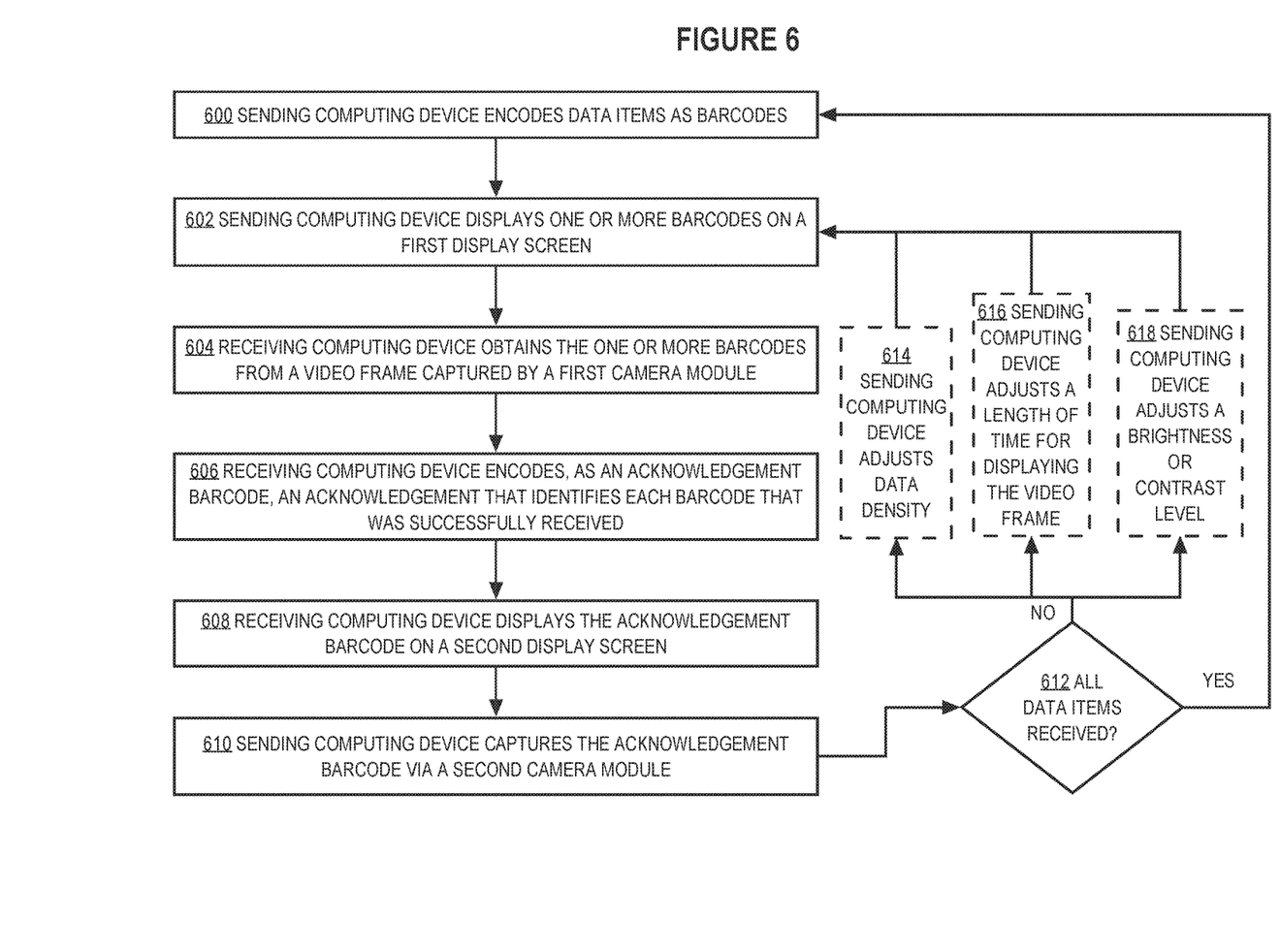
FIG. 6 is a flow diagram that depicts an approach for inter-device data transfer based on barcodes.

FIG. 6 is a flow diagram that depicts an approach for inter-device data transfer based on barcodes. At block 600, sending computing device 100 encodes data items 202A-N as barcodes 204A-N. Each barcode can include a sequence number.

At block 602, sending computing device 100 displays one or more barcodes of barcodes 204A-N on a first display screen 106. Multiple barcodes can be simultaneously displayed to make optimal use of the area of the first display screen 106. Block 602 can be performed concurrently with or subsequent to block 600.

At block 604, receiving computing device 102 obtains the one or more barcodes from a video frame 300A captured by a first camera module 108. The one or more barcodes can be decoded into one or more data items at any time after they are obtained. For example, they can be decoded as they are obtained or after all the barcodes 204A-N are obtained.

At block 606, receiving computing device 102 encodes, as an acknowledgement barcode 114, an acknowledgement 400 that identifies each barcode that was successfully received. The acknowledgement 400 can identify barcodes based on sequence numbers.

At block 608, receiving computing device 102 displays the acknowledgement barcode 114 on a second display screen 110. Multiple acknowledgement barcodes can be simultaneously displayed to make optimal use of the area of the second display screen 110.

At block 610, sending computing device 100 captures the acknowledgement barcode 114 via a second camera module 104. Based on the acknowledgement barcode 114, sending computing device 100 can determine which of the data items 202A-N were successfully received and which were not successfully received by the receiving computing device 102.

At block 612, sending computing device 100 determines whether all of data items 202A-N were successfully received by the receiving computing device 102. If so, block 612 can optionally proceed to block 600. For example, sending computing device 100 can commence sharing a different window of barcodes or an entirely different document. If not, block 612 can proceed to any of optional blocks 614-618 or proceed to block 602. For example, sending computing device 100 can make adjustments to the data transfer rate prior to repeating displaying of any barcodes that were not successfully received by the receiving computing device 102.

At optional block 614, sending computing device 100 adjusts data density. For example, the maximum amount of data that can be encoded in each barcode can be reduced in response to data loss that exceeds a threshold amount. Thus, data 200 can be divided into a larger number of data items 202A-N, which correspond to a larger number of barcodes 204A-N. Optional block 614 proceeds to block 602.

At optional block 616, sending computing device 100 adjusts frame rate. For example, a length of time for displaying the video frame 300A can be increased so that barcode detection will be improved. Thus, frame rate can be decreased in response to data loss that exceeds a threshold amount. Optional block 616 proceeds to block 602.

At optional block 618, sending computing device 100 adjusts display settings. For example, a brightness or contrast level of the first display screen 106 can be modified in response to data loss that exceeds a threshold amount. Adjusting display settings can improve barcode detection rates. Optional block 618 proceeds to block 602.

Any of blocks 612-618 can proceed to block 602, at which any undelivered barcodes can be displayed again. The process can iterate as many times as necessary to successfully deliver all of barcodes 204A-N.

Basic Computing Device

Figure 7:
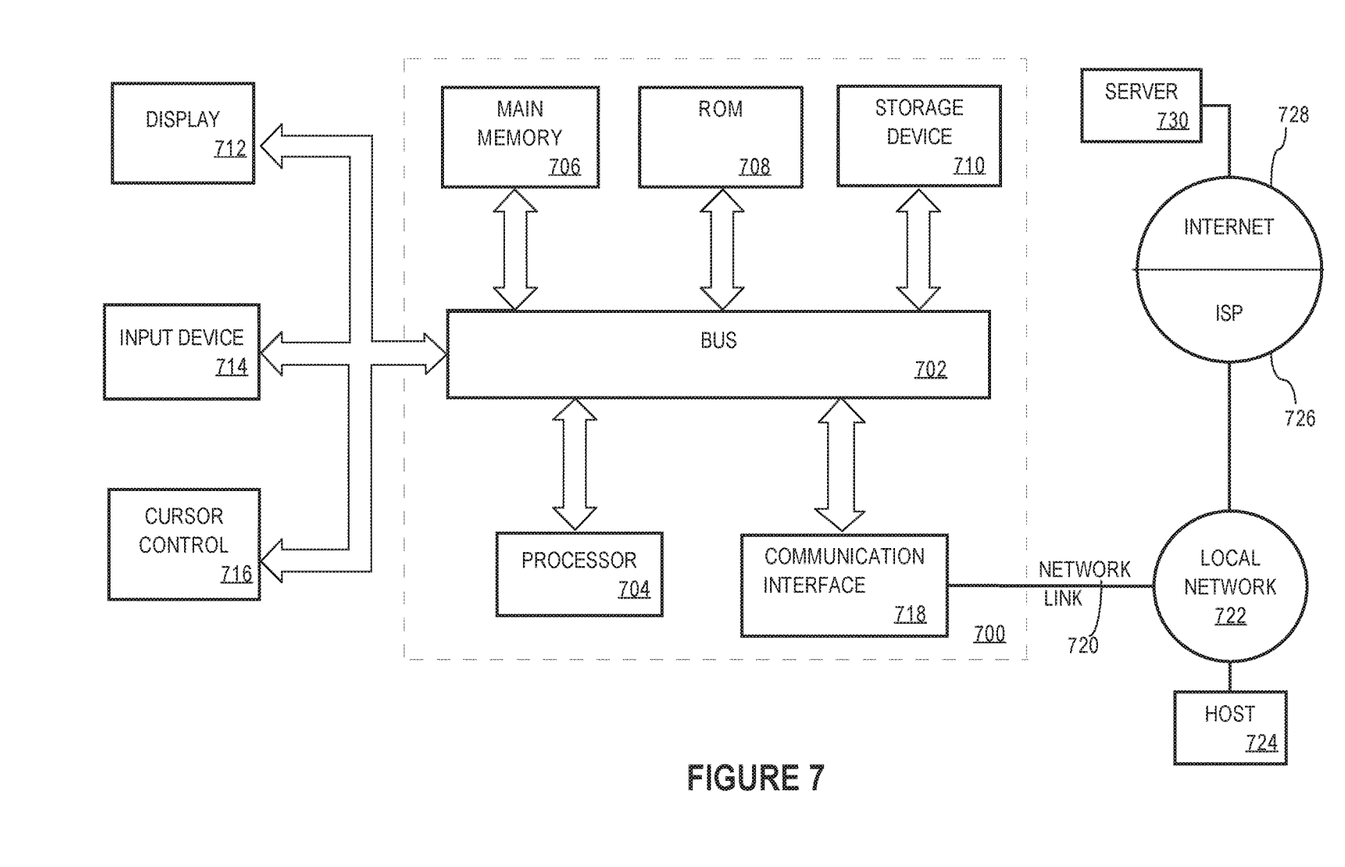
FIG. 7 is a very general block diagram of a computing device in which the example embodiment(s) of the present Application may be embodied.

Referring now to FIG. 7, it is a block diagram that illustrates a basic computing device 700 in which the example embodiment(s) of the present Application may be embodied. Computing device 700 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general purpose microprocessor, a system on a chip (SoC), or other processor.

Main memory 706, such as a random access memory (RAM) or other dynamic storage device, also may be coupled to bus 702 for storing information and software instructions to be executed by processor(s) 704. Main memory 706 also may be used for storing temporary variables or other intermediate information during execution of software instructions to be executed by processor(s) 704.

Software instructions, when stored in storage media accessible to processor(s) 704, render computing device 700 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and software instructions for processor(s) 704.

One or more mass storage devices 710 may be coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 710 (e.g., the main hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 7, one or more of display 712, input device 714, and cursor control 716 are external components (i.e., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such software instructions may be read into main memory 706 from another storage medium, such as storage device(s) 710. Execution of the software instructions contained in main memory 706 cause processor(s) 704 to perform the functions of the example embodiment(s).

While functions and operations of the example embodiment(s) may be implemented entirely with software instructions, hard-wired or programmable circuitry of computing device 700 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor(s) 704 for execution. For example, the software instructions may initially be carried on a magnetic disk or solid-state drive of a remote computer. The remote computer can load the software instructions into its dynamic memory and send the software instructions over a telephone line using a modem. A modem local to computing device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the software instructions. The software instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution.

Basic Software System

Figure 8:
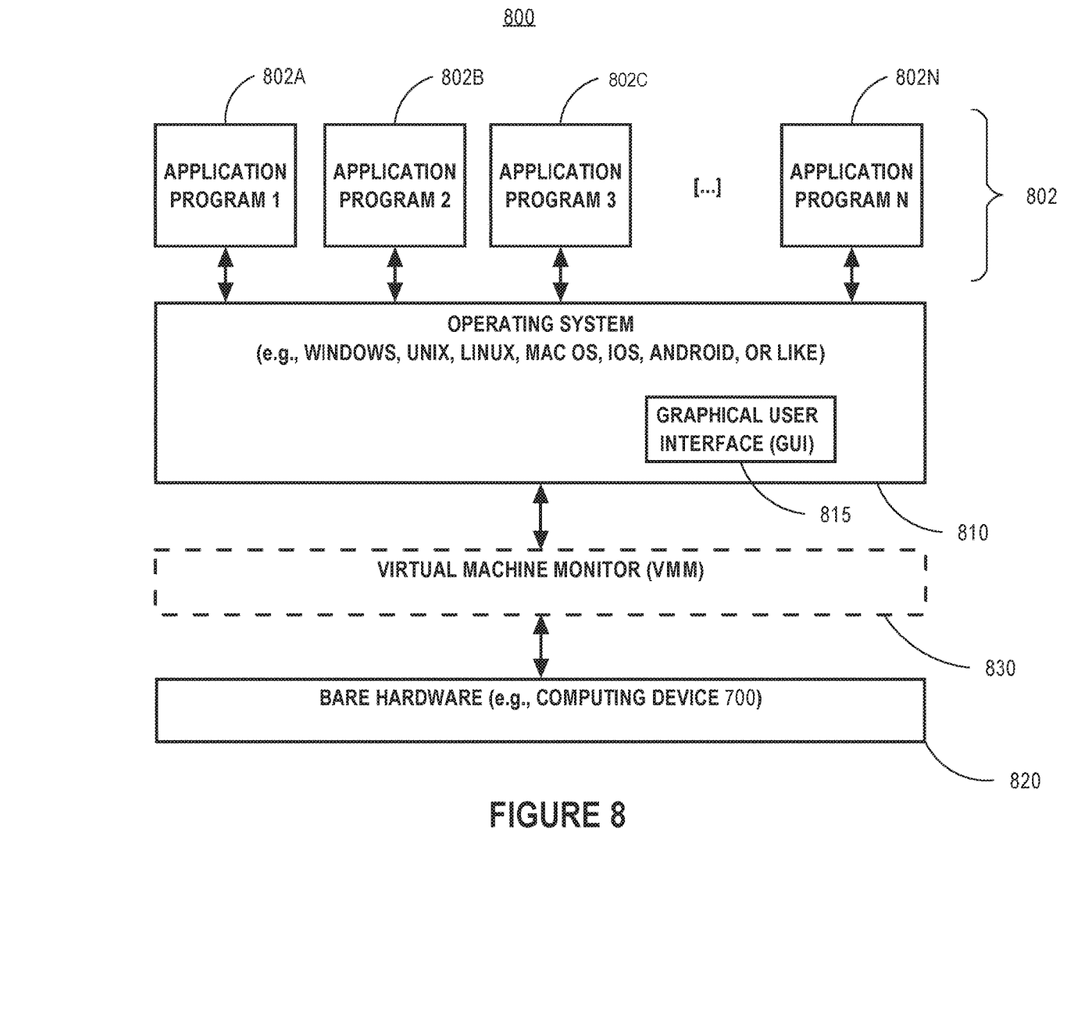
FIG. 8 is a block diagram of a basic software system for controlling the operation of the computing device.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

In the foregoing specification, the example embodiment(s) of the present Application have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
at a sending computing device comprising one or more processors and memory storing one or more computer programs executed by the one or more processors to perform the method, performing operations comprising:
encoding a plurality of data items as a plurality of barcodes;
simultaneously displaying, to a receiving computing device, two or more barcodes of the plurality of barcodes on a display screen of, or operatively coupled to, the sending computing device;
capturing an acknowledgement barcode via a camera module of, or operatively coupled to, the sending computing device, the acknowledgement barcode encoding one or more sequence numbers associated with one or more of the plurality of data items that were successfully received by the receiving computing device; and
determining, based on the one or more sequence numbers encoded in the acknowledgement barcode, which of the plurality of data items were successfully received by the receiving computing device and which of the plurality of data items were not successfully received by the receiving computing device.

2. The method of claim 1, wherein encoding a plurality of data items as a plurality of barcodes includes:
based on a previously captured acknowledgement barcode, adjusting a data density of the plurality of barcodes.

3. The method of claim 1, wherein each barcode of the two or more barcodes is overlaid with respect to each other using multiple color channels, each color channel of the multiple color channels encoding a respective barcode of the two or more barcodes.

4. The method of claim 3, wherein the multiple color channels comprise a red color channel, a green color channel, and a blue color channel.

5. The method of claim 1, wherein simultaneously displaying, to a receiving computing device, two or more barcodes of the plurality of barcodes on a display screen of, or operatively coupled to, the sending computing device includes:
based on a previously captured acknowledgement barcode, adjusting a length of time for displaying a single video frame that includes the two or more barcodes.

6. The method of claim 1, wherein simultaneously displaying, to a receiving computing device, two or more barcodes of the plurality of barcodes on a display screen of, or operatively coupled to, the sending computing device includes:
based on a previously captured acknowledgement barcode, adjusting a brightness level or a contrast level of the display screen.

7. The method of claim 1, wherein in response to determining, by the sending computing device, that one or more data items of the plurality of data items were not successfully received by the receiving computing device, repeating displaying, at the sending computing device, one or more barcodes corresponding to the one or more data items.

8. The method of claim 1, wherein the plurality of barcodes comprises matrix barcodes.

9. A method, comprising:
at a receiving computing device comprising one or more processors and memory storing one or more computer programs executed by the one or more processors to perform the method, performing operations comprising:
obtaining a plurality of barcodes from a single video frame captured by a camera module of, or operatively coupled to, the receiving computing device;
encoding, as an acknowledgment barcode, an acknowledgment that the plurality of barcodes were successfully received, wherein the acknowledgement identifies each barcode of the plurality of barcodes by a sequence number associated with a data item encoded in the barcode; and
displaying, to a sending computing device, the acknowledgment barcode on a display screen of, or operatively coupled to, the receiving computing device.

10. The method of claim 9, wherein each barcode of the plurality of barcodes is overlaid with respect to each other using multiple color channels, each color channel of the multiple color channels encoding a respective barcode of the plurality of barcodes.

11. The method of claim 10, wherein the multiple color channels comprise a red color channel, a green color channel, and a blue color channel.

12. The method of claim 9, wherein the plurality of barcodes comprises matrix barcodes.

13. A system, comprising:
storage media;
one or more processors;
and one or more programs stored in the storage media and configured for execution by the one or more processors, the one or more programs comprising instructions for:
encoding, at a sending computing device, a plurality of data items as a plurality of barcodes;
simultaneously displaying, to a receiving computing device, two or more barcodes of the plurality of barcodes on a first display screen of, or operatively coupled to, the sending computing device;
obtaining, at the receiving computing device, the two or more barcodes from a single video frame captured by a first camera module of, or operatively coupled to, the receiving computing device;
encoding as an acknowledgment barcode, at the receiving computing device, an acknowledgment that at least some of the plurality of barcodes were successfully received, wherein the acknowledgement identifies each barcode of the plurality of barcodes that was successfully received by a sequence number associated with a data item encoded in the barcode;
displaying, to the sending computing device, the acknowledgment barcode on a second display screen of, or operatively coupled to, the receiving computing device;
capturing, at the sending computing device, the acknowledgement barcode via a second camera module of, or operatively coupled to, the sending computing device; and
based on one or more sequence numbers encoded in the acknowledgement barcode, determining, by the sending computing device, which of the plurality of data items were successfully received by the receiving computing device and which of the plurality of data items were not successfully received by the receiving computing device.

14. The system of claim 13, wherein encoding, at a sending computing device, a plurality of data items as a plurality of barcodes includes:

based on a previously captured acknowledgement barcode, adjusting a data density of the plurality of barcodes.

15. The system of claim 13, wherein each barcode of the two or more barcodes is overlaid with respect to each other using multiple color channels, each color channel of the multiple color channels encoding a respective barcode of the two or more barcodes.

16. The system of claim 15, wherein the multiple color channels comprise a red color channel, a green color channel, and a blue color channel.

17. The system of claim 13, wherein simultaneously displaying, to a receiving computing device, two or more barcodes of the plurality of barcodes on a first display screen of, or operatively coupled to, the sending computing device includes:
 based on a previously captured acknowledgement barcode, adjusting a length of time for displaying the single video frame that includes the two or more barcodes.

18. The system of claim 13, wherein simultaneously displaying, to a receiving computing device, two or more barcodes of the plurality of barcodes on a first display screen of, or operatively coupled to, the sending computing device includes:
 based on a previously captured acknowledgement barcode, adjusting a brightness level or a contrast level of the first display screen.

19. The system of claim 13, wherein in response to determining, by the sending computing device, that one or more data items of the plurality of data items were not successfully received by the receiving computing device, repeating displaying, at the sending computing device, one or more barcodes corresponding to the one or more data items.

20. The system of claim 13, wherein the plurality of barcodes comprises matrix barcodes.

* * * * *